United States Patent
Kawaguchi et al.

(10) Patent No.: US 10,377,633 B2
(45) Date of Patent: Aug. 13, 2019

(54) CARBON MATERIAL, METHOD FOR PRODUCING SAME, AND USE FOR SAME

(71) Applicant: SHOWA DENKO K.K., Tokyo (JP)

(72) Inventors: Naoto Kawaguchi, Tokyo (JP); Takashi Terashima, Tokyo (JP); Yoshikuni Sato, Tokyo (JP); Yasuaki Wakizaka, Tokyo (JP)

(73) Assignee: SHOWA DENKO K.K., Tokyo (JP)

(*) Notice: Subject to any disclaimer, the term of this patent is extended or adjusted under 35 U.S.C. 154(b) by 183 days.

(21) Appl. No.: 15/546,786

(22) PCT Filed: Feb. 8, 2016

(86) PCT No.: PCT/JP2016/053665
§ 371 (c)(1),
(2) Date: Jul. 27, 2017

(87) PCT Pub. No.: WO2016/129557
PCT Pub. Date: Aug. 18, 2016

(65) Prior Publication Data
US 2018/0009665 A1    Jan. 11, 2018

(30) Foreign Application Priority Data
Feb. 9, 2015    (JP) .................. 2015-023267

(51) Int. Cl.
*C01B 32/05* (2017.01)
*C01B 32/20* (2017.01)
(Continued)

(52) U.S. Cl.
CPC .............. *C01B 32/05* (2017.08); *C01B 32/20* (2017.08); *H01M 4/133* (2013.01);
(Continued)

(58) Field of Classification Search
CPC .... H01M 4/133; H01M 4/1393; H01M 4/587; C01B 32/05; C01B 32/20; C01P 2002/78;
(Continued)

(56) References Cited

U.S. PATENT DOCUMENTS

| | | |
|---|---|---|
| 5,587,255 A | 12/1996 | Sonobe et al. |
| 6,632,569 B1 | 10/2003 | Kameda et al. |

(Continued)

FOREIGN PATENT DOCUMENTS

| | | |
|---|---|---|
| JP | 3126030 B2 | 1/2001 |
| JP | 3361510 B2 | 1/2003 |

(Continued)

OTHER PUBLICATIONS

International Search Report of PCT/JP2016/053665 dated Mar. 29, 2016 [PCT/ISA/210].

*Primary Examiner* — Daniel C. McCracken
(74) *Attorney, Agent, or Firm* — Sughrue Mion, PLLC (57) ABSTRACT

A non-flaky carbon material having specific optical structures, wherein the ratio between the peak intensity I110 of (110) plane and the peak intensity I004 of (004) plane of a graphite crystal determined by the powder XRD measurement, I110/I004, is 0.10 or more and 0.35 or less; an average circularity is 0.80 or more and 0.95 or less; d002 is 0.337 nm or less; and the total pore volume of pores having a diameter of 0.4 μm or less measured by the nitrogen gas adsorption method is 25.0 μl/g or more and 40.0 μl/g or less. Also disclosed is a method for producing the carbon material, a carbon material for a battery electrode, a paste for an electrode incorporating the carbon material for a battery electrode, an electrode for a lithium battery incorporating a formed body of the paste for an electrode, a lithium-ion secondary battery including the electrode and a method for producing the electrode.

13 Claims, 1 Drawing Sheet

(51) Int. Cl.
*H01M 4/133* (2010.01)
*H01M 4/587* (2010.01)
*H01M 4/1393* (2010.01)

(52) U.S. Cl.
CPC ......... *H01M 4/1393* (2013.01); *H01M 4/587* (2013.01); *C01P 2002/72* (2013.01); *C01P 2002/78* (2013.01); *C01P 2002/82* (2013.01); *C01P 2004/51* (2013.01); *C01P 2006/14* (2013.01); *C01P 2006/16* (2013.01)

(58) Field of Classification Search
CPC ............. C01P 2006/16; C01P 2002/72; C01P 2004/51; C01P 2006/14; C01P 2002/82
See application file for complete search history.

(56) References Cited

U.S. PATENT DOCUMENTS

| | | |
|---|---|---|
| 7,141,229 B2 | 11/2006 | Kawano et al. |
| 8,372,373 B2 | 2/2013 | Nishimura et al. |
| 2004/0013942 A1* | 1/2004 | Fukumoto ................ H01B 1/04 429/231.8 |
| 2014/0057166 A1 | 2/2014 | Yokoyama et al. |
| 2014/0335428 A1* | 11/2014 | Wakizaka ............. H01M 4/583 429/338 |
| 2015/0162600 A1 | 6/2015 | Wakizaka et al. |
| 2015/0263348 A1 | 9/2015 | Wakizaka et al. |
| 2017/0155149 A1* | 6/2017 | Kawaguchi ........... H01M 4/133 |

FOREIGN PATENT DOCUMENTS

| | | | |
|---|---|---|---|
| JP | 2003-077534 A | 3/2003 | |
| JP | 3534391 B2 | 6/2004 | |
| JP | 3653105 B2 | 5/2005 | |
| JP | 2011-082054 A | 4/2011 | |
| JP | 4945029 B2 | 6/2012 | |
| JP | 2014-208582 A | 11/2014 | |
| KR | 10-2013-0097224 A | 9/2013 | |
| KR | 10-2014-0063886 A | 5/2014 | |
| WO | 2011/049199 A1 | 4/2011 | |
| WO | 2014/003135 A1 | 1/2014 | |
| WO | 2014/058040 A1 | 4/2014 | |
| WO | 2014/157318 A1 | 10/2014 | |
| WO | 2015/016182 A1 | 2/2015 | |
| WO | WO 2015/182560 * | 5/2015 | ............. C01B 31/04 |

* cited by examiner

CARBON MATERIAL, METHOD FOR PRODUCING SAME, AND USE FOR SAME

CROSS REFERENCE TO RELATED APPLICATIONS

This application is a National Stage of International Application No. PCT/JP2016/053665, filed Feb. 8, 2016, claiming priority based on Japanese Patent Application No. 2015-023267, filed Feb. 9, 2015, the contents of all of which are incorporated herein by reference in their entirety.

TECHNICAL FIELD

The present invention relates to a carbon material, a method of producing the same, and applications of the same. Specifically, the present invention relates to a carbon material which exhibits good electrode filling property, high energy density and high input-output power characteristics as an electrode material for a non-aqueous electrolyte secondary battery; a method for producing the same; and a secondary battery having good charge/discharge cycle characteristics, and high coulomb efficiency.

BACKGROUND ART

A lithium ion secondary battery has been developed for various uses and there has been a demand for performance suitable for various uses ranging from use in a small-sized mobile device to use in a large-sized battery-powered electric vehicle (BEV) and a hybrid electric vehicle (HEV).

For use in a mobile device, with the progress of small-size and lightweight electronic devices as well as the increase in the power consumption due to the diversification of functions, a lithium ion secondary battery having a higher energy density is required.

Further, there is an increasing demand for a secondary battery with a high output and a large capacity for electric tools such as an electric drill and a hybrid automobile. In this field, conventionally, a lead secondary battery, a nickel-cadmium secondary battery, and a nickel-hydrogen secondary battery are mainly used. However, a small and light lithium ion secondary battery with high energy density is highly expected, and there is a demand for a lithium ion secondary battery having excellent large current load characteristics.

In particular, in applications for automobiles, such as battery electric vehicles (BEV) and plug-in hybrid electric vehicles (PHEV), a long-term cycle characteristic over 10 years and a large current load characteristic for driving a high-power motor are mainly required, and a high volume energy density is also required for extending a mileage. Since a large-sized lithium ion secondary battery is expensive, reduction in cost is also required.

Generally, a carbon material such as graphite, hard carbon and soft carbon is used as a negative electrode active material for a lithium ion secondary battery. While hard carbon and soft carbon described in Japanese Patent No. 3653105 (U.S. Pat. No. 5,587,255; Patent Document 1) are excellent in a characteristic with respect to a large current and also have a relatively satisfactory cycle characteristic, the most widely used material is graphite.

Graphite is classified into natural graphite and artificial graphite.

Among those, natural graphite is available at a low cost and has high discharge capacity and electrode filling property due to high degree of graphitization. However, natural graphite has such problems that its particle shape is flake, that it has a high specific surface area, and that it has a significantly low coulomb efficiency at the initial charging and discharging because the electrolyte is decomposed due to highly reactive edge surfaces of graphite, which leading to gas generation. In addition, the cycle characteristics of a battery using natural graphite are not very good. In order to solve those problems, Japanese Patent publication No. 3534391 (U.S. Pat. No. 6,632,569, Patent Document 2) and the like propose a method involving coating carbon on the surface of the natural graphite processed into a spherical shape.

Regarding artificial graphite, there is exemplified graphitized mesocarbon microbeads described in Japanese Patent No. 3126030 (Patent Document 3) and the like.

Graphitized materials made from petroleum pitch, coal pitch, coke and the like is available at a relatively low cost. However, a needle-shaped coke with high crystallinity is flaky and tends to align. In order to solve this problem, the method described in Japanese patent publication No. 3361510 (Patent Document 4) and the like yield results.

In JP 2003-77534 A (Patent Document 5), examination is performed to achieve excellent high-rate charge/discharge characteristics by using artificial graphite having relatively large interparticle spaces.

WO 2011/049199 (U.S. Pat. No. 8,372,373; Patent Document 6) discloses artificial graphite being excellent in cycle characteristics.

Japanese Patent No. 4945029 (U.S. Pat. No. 7,141,229; Patent Document 7) discloses an artificial graphite negative electrode produced from green needle coke having a flow structure which is produced with the addition of boron.

WO 2014/003135 (Patent Document 8) discloses a flaky carbon material in which the surface of a carbon material having specific optical structures is coated.

WO 2014/058040 (US 2015/0263348 A1; Patent Document 9) discloses a carbon material having specific optical structures and containing boron.

PRIOR ART

Patent Documents

Patent Document 1: JP 3653105 B2 (U.S. Pat. No. 5,587,255)
Patent Document 2: JP 3534391 B2
Patent Document 3: JP 3126030 B2
Patent Document 4: JP 3361510 B2
Patent Document 5: JP 2003-77534 A
Patent Document 6: WO 2011/049199 (U.S. Pat. No. 8,372,373)
Patent Document 7: JP 4945029 B2 (U.S. Pat. No. 7,141,229)
Patent Document 8: WO 2014/003135
Patent Document 9: WO 2014/058040 (US 2015/0263348 A1)

DISCLOSURE OF THE INVENTION

Problems to be Solved by the Invention

The negative electrode material described in Patent Document 1 is excellent in properties against large current. However, its volume energy density is too low and the price of the material is very expensive, and thus, such negative electrode materials are only used for some special large batteries.

The material produced by the method described in Patent Document 2 can address a high-capacity, a low-current, and an intermediate-cycle characteristic required by the mobile applications and the like. However, it is very difficult for the material to satisfy the above-described requests such as a large current and an ultralong-term cycle characteristic of a large battery.

The graphitized material described in Patent Document 3 is a well-balanced negative electrode material, and is capable of producing a battery having a high capacity and excellent cycle characteristics. However, the contact area between the particles is small due to the particles close to perfect spheres having high circularity. As a result, the material has drawbacks of high resistance and low input-output characteristics.

The method according to Patent Document 4 can allow the use of not only fine powder of an artificial graphite material but also fine powder of a natural graphite, or the like, and exhibits very excellent performance for a negative electrode material for the mobile applications. This material can address the high-capacity, the low-current, and the intermediate cycle characteristic required for the mobile applications, etc. However, this material has also not satisfied the above-described requests such as a large current and an ultralong-term cycle characteristic of a large battery.

In Patent Document 5, the capacity retention at the time of charge and discharge is not sufficient for actual use in secondary batteries.

In Patent Document 6, the graphite has a high texture density and there was room for improvement on the ion diffusion of the active substance. In addition, since the particles have a shape close to a perfect sphere, the contact area between the particles is small when an electrode is manufactured, resulting in a problem of increase in the electric resistance.

In Patent Document 7, the capacity and initial charge-discharge efficiency showed some improvement compared to the case of using conventional artificial graphite. However, the production comprises very costly processes such as carbonizing the pulverized green coke by calcination and performing graphitization in an argon stream and was not practical.

Means to Solve the Problem

The present invention provides a carbon material as described below, a method for producing the same, and use of the same.

[1] A carbon material, being a non-flaky carbon material, wherein a ratio between a peak intensity I110 of (110) plane and a peak intensity I004 of (004) plane of a graphite crystal determined by a powder XRD measurement, I110/I004, is 0.10 or more and 0.35 or less; an average circularity is 0.80 or more and 0.95 or less; an average interplanar spacing d002 of (002) plane by an X-ray diffraction method is 0.337 nm or less; and a total pore volume of pores having a diameter of 0.4 μm or less measured by a nitrogen gas adsorption method is 25.0 μl/g or more and 40.0 μl/g or less; and by observing optical structures in a cross-section of the carbon material, when areas of the optical structures are accumulated from a smallest structure in an ascending order, SOP represents an area of an optical structure whose accumulated area corresponds to 60% of a total area of all the optical structures; when the structures are counted from a structure of a smallest aspect ratio in an ascending order, AROP represents an aspect ratio of a structure which ranks at a position of 60% in a total number of all the structures; and when D50 represents a median diameter in a volume-based cumulative particle size distribution by laser diffraction method, SOP, AROP and D50 satisfy the following relationships:

$1.5 \leq AROP \leq 6.0$ and $0.2 \times D50 \leq (SOP \times AROP)^{1/2} < 2 \times D50$.

[2] The carbon material as described in [1] above, wherein the carbon material has a D50 value of 1 μm or more and 30 μm or less.

[3] The carbon material as described in [1] or [2] above, whose BET specific surface area is 3.0 m$^2$/g or more and 9.0 m$^2$/g or less.

[4] The carbon material as described in any one of [1] to [3] above, whose R value (ID/IG) as being an intensity ratio between a peak intensity (ID) of a peak in a vicinity of 1350 cm$^{-1}$ and a peak intensity (IG) of a peak in a vicinity of 1580 cm$^{-1}$ measured by Raman spectroscopy spectra is 0.08 or more and 0.18 or less.

[5] A method for producing the carbon material as described in any one of [1] to [4] above, comprising a process of graphitizing particles with D50 of 10 μm or less obtained by pulverizing a coke having a thermal history of 1,000° C. or less by heating at 2,400° C. to 3,600° C., and a process of bringing the pulverized particles into contact with an oxygen gas during heating, wherein, by observing optical structures in a cross-section of the coke, when areas of the optical structures are accumulated from a smallest structure in an ascending order, an area of an optical structure whose accumulated area corresponds to 60% of a total area of all the optical structures is 50 to 5,000 μm$^2$; and when the optical structures are counted from a structure of a smallest aspect ratio in an ascending order, an aspect ratio of a structure which ranks at a position of 60% in a total number of all the structures is 1.5 or more and 6 or less.

[6] The method for producing a carbon material as described in [5] above, wherein the process of bringing the pulverized particles into contact with an oxygen gas is conducted at a time of heating in the process of graphitization.

[7] The method for producing a carbon material as described in [5] above, wherein the process of bringing the pulverized particles into contact with an oxygen gas is conducted at a time of cooling after the process of graphitization.

[8] The method for producing a carbon material as described in [5] above, wherein the process of bringing the pulverized particles into contact with an oxygen gas is conducted in a separate heating treatment after completion of the graphitization process.

[9] A carbon material for a battery electrode, comprising the carbon material described in any one of [1] to [4] above.

[10] A paste for an electrode comprising the carbon material for a battery electrode described in [9] above a binder.

[11] An electrode for a lithium battery comprising the formed body of the paste for an electrode described in [10] above.

[12] A lithium-ion secondary battery comprising the electrode described in [11] above as a constituting element.

[13] A method for producing an electrode for a lithium battery, comprising a process of applying the paste for an electrode described in [10] above on a current collector followed by drying and compressing at a pressure of 1 to 3 t/cm$^2$.

Effects of the Invention

Using the carbon material of the present invention as the carbon material for the battery electrode makes it possible to obtain a low-resistance battery electrode which has a high capacity, high energy density and high coulomb efficiency, and the capability of high-speed charge and discharge when a battery is fabricated, while maintaining high cycle characteristics.

Further, the carbon material of the present invention can be produced by the method excellent in economic efficiency and mass productivity with safety improved.

MODE FOR CARRYING OUT THE INVENTION (1) Carbon Material

The electrode of the rechargeable battery is required to charge more electricity per unit volume. Graphite is excellent in coulomb efficiency at initial charge and discharge. However, there is an upper limit to the stoichiometric proportion of the lithium atoms to carbon atoms at the time of intercalation of lithium and it is difficult to further increase the energy density per mass. Therefore, it is necessary to increase the mass density per electrode volume to improve the energy density of the electrode.

Generally, to be used as an electrode for a battery, an electrode is produced by applying an active material onto a current collector plate, drying and subsequent pressing to thereby improve the filling property of the negative electrode active material per volume. If the graphite particles are soft enough to be deformed to some degree by pressing, it is possible to significantly increase the electrode density.

Since graphite particles are hard when the graphite has an entangled structure, it is desirable to allow the graphite particles to have a large structure in order to increase the electrode density. It has been long known that, as a structure which is observed in graphite particles, there are a structure which exhibits optical anisotropy by crystal developing and graphite planes arranged, and a structure which exhibits optical isotropy by crystal not developing completely or largely disordered such as hard carbon. With respect to the observation of these structures, a crystallite size can be measured by the X-ray diffraction method and the structures can be observed by a polarizing microscope observation method described in, for example, "Modern Carbon Material Experimental Technology (Analysis part) edited by The Carbon Society of Japan (2001), published by Sipec Corporation, pages 1-8". In the present description, an individual domain in which a color other than black (a color other than the sensitive color when a sensitive color plate is used) can be observed when a sample was observed under a crossed-nicol state of a polarizing microscope is referred to as an optical structure.

In the carbon material in a preferable embodiment of the present invention, the size and shape of the optical structures are within a specific range. Furthermore, due to an appropriate degree of graphitization, it becomes a material being excellent both in easiness to be collapsed as a material for an electrode and in battery properties.

With respect to the size and shape of the optical structure, the carbon material of the present invention satisfies the following formula:

$$1.5 \leq AROP \leq 6.0 \text{ and}$$

$$0.2 \times D50 \leq (SOP \times AROP)^{1/2} < 2 \times D50.$$

By observing optical structures in the cross-section of the formed body made of the carbon material under a polarizing microscope, when areas of the optical structures are accumulated from the smallest structure in an ascending order, SOP represents the area of the optical structure whose accumulated area corresponds to 60% of the total area of all the optical structures. In the same observation, when the structures are counted from a structure of the smallest aspect ratio in an ascending order, AROP represents the aspect ratio of the structure which ranks at the position of 60% in the total number of all the structures.

Since the optical structures in the carbon material are cured while flowing, it is often strip-shaped. When the cross-section of the carbon material is observed, the shape of the optical structures is almost rectangular, and it can be assumed that the area of the structure corresponds to the product of the long diameter and the short diameter of the structure. Also, the short diameter is the long diameter/aspect ratio. Assuming that the optical structure as an object to be measured for the area represented by SOP and the optical structure as an object to be measured for the aspect ratio represented by AROP are the same, the long diameter in the optical structure turns to be $(SOP \times AROP)^{1/2}$. That is, $(SOP \times AROP)^{1/2}$ defines the long diameter in an optical structure having a specific size, and based on the ratio of $(SOP \times AROP)^{1/2}$ to D50, the above-mentioned formula defines that the optical structure is larger than a certain size.

$(SOP \times AROP)^{1/2}$ which defines a long diameter of an optical structure is generally smaller than D50. However, when the $(SOP \times AROP)^{1/2}$ value is closer to D50, it means that the particles in the carbon material consist of a smaller number of optical structures. In a case where $(SOP \times AROP)^{1/2}$ is smaller compared to D50, it means that the particles in the carbon material comprise a large number of optical structures. When the $(SOP \times AROP)^{1/2}$ value is 0.2× D50 or more, there are fewer borders of the optical structures, which is preferable for the lithium ion diffusion and enables a high-rate charge and discharge. When the value is larger, the carbon material can retain a larger number of lithium ions. The value is preferably 0.25×D50 or more, more preferably 0.28×D50 or more, and still more preferably 0.35×D50 or more. The upper limit value is less than 2×D50 at maximum, preferably 1× D50 or less.

D50 represents a 50% particle diameter (a median diameter) in a volume-based cumulative particle size distribution measured by a laser-diffractometry particle size distribution analyzer, and indicates an apparent diameter of the particles. As a laser diffraction type particle size distribution analyzer, for example, Mastersizer (registered trademark) produced by Malvern Instruments Ltd. or the like can be used.

D50 of the carbon material in a preferable embodiment of the present invention is 1 μm or more and 30 μm or less. Pulverizing by special equipment is required to make D50 less than 1 μm and more energy is required as a result. In addition, it is difficult to handle particles having D50 less than 1 μm due to aggregation and reduction in the coating processability, and excessive increase in the surface area reduces the initial charge-discharge efficiency. On the other hand, if the D50 value is too large, it takes a longer time for the lithium diffusion in the negative electrode material and the input-output characteristics is reduced.

A preferred D50 value is from 5 μm or more and 20 μm or less. A carbon material having a particle size in this range is easy to handle, has high input-output characteristics, and can withstand a large current required for use in the driving power source for automobile and the like.

The aspect ratio of the carbon material, AROP, is preferably 1.5 or more and 6.0 or less, more preferably 2.0 or more and 4.0 or less, still more preferably 2.0 or more and 2.3 or less. An aspect ratio larger than the above lower limit is preferable because it allows the structures to slide over each other and an electrode having a high density can be easily obtained. An aspect ratio smaller than the upper limit is preferable because it requires less energy to synthesize a raw material.

The methods for observation and analysis of the optical structures are as described below.

[Production of Polarizing Microscope Observation Sample]

The "cross-section of a carbon material" as used herein is prepared as follows.

A double-stick tape is attached to the bottom of a sample container made of plastic with an internal volume of 30 cm³, and two spatula scoops (about 2 g) of a sample for observation is placed on the double-stick tape. A curing agent (Curing Agent (M-agent) (trade name), produced by Nippon Oil and Fats Co., Ltd., available from Marumoto Struers K.K.) is added to cold embedding resin (Cold embedding resin #105 (trade name), produced by Japan Composite Co., Ltd., available from Marumoto Struers K.K.), and the mixture is kneaded for 30 seconds. The resultant mixture (about 5 ml) is poured slowly to the sample container to a height of about 1 cm and allowed to stand still for 1 day to be coagulated. Next, the coagulated sample is taken out and the double-stick tape is peeled off. Then, a surface to be measured is polished with a polishing machine with a rotary polishing plate.

The polishing is performed so that the polishing surface of the sample is pressed against the rotary surface. The polishing plate is rotated at 1,000 rpm. The polishing is performed successively, using polishing plates having particle sizes (grit numbers) of #500, #1000, and #2000 in this order, and finally, mirror-surface polishing is performed, using alumina (BAIKALOX (registered trademark) type 0.3CR (trade name) with a particle diameter of 0.3 μm, produced by BAIKOWSKI, available from Baikowski Japan).

The polished sample is fixed onto a preparation with clay and observed with a polarizing microscope (BX51, produced by Olympus Corporation).

[Polarizing Microscope Image Analysis Method]

The observation was performed at 200-fold magnification. An image observed with the polarizing microscope is photographed by a CAMEDIA (registered trademark) C-5050 ZOOM digital camera produced by Olympus Corporation connected to the polarizing microscope through an attachment. The shutter time is 1.6 seconds. Among the photographed data, images with 1,200×1,600 pixels were used as an analysis object. It corresponds to a microscope field of 480 μm×640 μm. It is desirable to use larger number of images for the analysis and measurement error can be reduced by using 40 images or more. The image analysis was performed using ImageJ (produced by National Institutes of Health) to discriminate blue portions, yellow portions, magenta portions and black portions.

The parameters defining each color when ImageJ was used are given below.

|  | Hue value | Saturation value | Brightness value |
|---|---|---|---|
| Blue | 150 to 190 | 0 to 255 | 80 to 255 |
| Yellow | 235 to 255 | 0 to 255 | 80 to 255 |
| Magenta | 193 to 255 | 180 to 255 | 120 to 255 |
| Black | 0 to 255 | 0 to 255 | 0 to 120 |

The statistical processing with respect to the detected structures is performed using an external macro-file. The black portions, that is, portions corresponding not to optical structures but to resin are excluded from the analysis, and the area and aspect ratio of each of blue, yellow and magenta optical structures are to be calculated.

The carbon material in an embodiment of the present invention comprises carbon particles that are not flaky. This is to prevent the orientation of the carbon network layer at the time of producing an electrode. Orientation is used as an index of the degree of flakiness. That is, in the carbon material in an embodiment of the present invention, $I_{110}/I_{004}$ as being the ratio between the peak intensity $I_{110}$ of plane (110) and the peak intensity $I_{004}$ of plane (004) of a graphite crystal in the XRD pattern determined by the powder XRD measurement is 0.1 or more and 0.35 or less. The ratio is preferably 0.18 or more and 0.30 or less, still more preferably 0.21 or more and 0.30 or less. A carbon material having an $I_{110}/I_{004}$ value less than 0.10 has too high orientation and makes an electrode easier to expand at the time of initial charge and discharge. In addition, the carbon network layer becomes parallel to the electrode plate, which makes the Li ion insertion difficult to proceed and leads to degradation of the rapid charge-discharge characteristics. When a carbon material has an $I_{110}/I_{004}$ value higher than 0.35, the orientation of the material is too low, and the electrode density becomes difficult to increase at the time of pressing during the production of an electrode.

In addition, when the carbon particles are flaky, it becomes difficult to handle them due to the decrease in the bulk density. They have low affinity for a solvent when they are made into slurry for producing an electrode, which leads to a reduced peeling strength of the electrode in some cases.

The orientation of particles is also related to the above mentioned optical structures. In particular, with respect to carbon particles produced by pulverizing a carbon material, the shape of the particles becomes flaky and the particles tend to be oriented, when AROP is a large value such as 1.5 or more. Therefore, the thermal history of the carbon material as described below is critical in order to decrease orientation while maintaining the above-described optical structures.

In the carbon material in an embodiment of the present invention, particles have an average circularity of 0.80 to 0.95. As described above, an average circularity is lowered in the case of flaky particles and the case of particles having irregular shapes. In the case of flaky particles, the rapid charge-discharge characteristics are degraded. In the case of particles having irregular shapes, the electrode density is difficult to increase at the time of producing an electrode due to the increased gap between the particles. On the other hand, if the average circularity is too high, the contact area between the particles becomes smaller at the time of producing an electrode, which leads to high resistance and degradation of input-output characteristics. The average circularity is preferably 0.83 to 0.93, more preferably 0.85 to 0.90.

The average circularity is calculated from the frequency distribution of the circularity obtained from the analysis of 10,000 particles or more in the LPF mode by using FPIA-3000 manufactured by Sysmex Corporation. Here, circularity is a value obtained by dividing the circumferential length of a circle having the same area with that of the observed particle image by the circumferential length of the particle image, and the particle image is closer to a true circle when its circularity is closer to 1. When S represents the area and L represents the circumferential of the particle image, circularity is represented by the following formula.

$$\text{Circularity}=(4\Pi S)^{1/2}/L$$

The carbonaceous layer present on the surface of the carbon material in an embodiment of the present invention has an R value (ID/IG) of preferably 0.08 or more and 0.18 or less, more preferably 0.09 or more and 0.16 or less, which value is the ratio between the peak intensity ID of a peak within the range of 1300 to 1400 cm$^{-1}$ derived from an amorphous component and the peak intensity IG of a peak within the range of 1580 to 1620 cm$^{-1}$ derived from a graphite component measured by Raman spectroscopy spectra. When the R value is less than 0.08, the rapid charge-discharge property is impaired due to high graphite crystallinity. When the R value exceeds 0.18, it promotes side reactions at the time of charge and discharge by the existence of many defects, resulting in the deterioration of the cycle characteristics. By allowing the carbon material to have an appropriate R value, it becomes a material which undergoes less self-discharge and degradation of a battery when it is held after charging.

The Raman spectrum can be measured, for example, using NRS-5100 produced by JASCO Corporation, by observing under the attached microscope.

The carbon material in a preferable embodiment of the present invention has an average interplanar spacing (002) plane by the X-ray diffraction method, d002, of 0.337 nm or less. This increases the amount of lithium ions to be intercalated and desorbed; i.e. increases the weight energy density. Further, a thickness Lc of the crystal in the C-axis direction is preferably 50 to 1,000 nm from the viewpoint of the weight energy density and easiness to be collapsed. More preferably, d002 is 0.3365 nm or less and Lc is 100 nm or more and 1,000 nm or less.

d002 and Lc can be measured using a powder X-ray diffraction (XRD) method by a known method (see I. Noda and M. Inagaki, Japan Society for the Promotion of Science, 117th Committee material, 117-71-A-1 (1963), M. Inagaki et al., Japan Society for the Promotion of Science, 117th committee material, 117-121-C-5 (1972), M. Inagaki, "carbon", 1963, No. 36, pages 25-34).

In a preferred embodiment of the present invention, the BET specific surface area of the carbon material is 3.0 m$^2$/g or more and 9.0 m$^2$/g or less, more preferably 3.0 m$^2$/g or more and 7.5 m$^2$/g or less, and still more preferably 3.0 m$^2$/g or more and 6.5 m$^2$/g or less. By setting the BET specific surface area to be within the above-mentioned range, irreversible side reactions on the surface of the active material can be suppressed and a large area to be contacted with an electrolyte can be secured without excessive use of a binder. As a result, the input-output characteristics can be improved.

The BET specific surface area is measured by a common method of measuring the absorption and desorption amount of gas per mass. As a measuring device, for example, NOVA-1200 can be used.

In the carbon material in an embodiment of the present invention, the total pore volume of the pores having a diameter of 0.4 μm or less measured by the nitrogen gas adsorption method with liquid nitrogen cooling is found to be 25.0 μl/g to 40.0 μl/g. When the total pore volume is within the range, the electrolytic solution is allowed to impregnate easily and the rapid charge and discharge characteristics are improved at the same time. Pores are generated and enlarged by undergoing a moderate oxidation, and thus a carbon material having a total pore volume within the above-described range can be produced. When the total pore volume is 25.0 μl/g or more, the negative electrode obtained from the graphite powder can attain a high initial charge-discharge efficiency, in which a side reaction is less likely to occur. When the total pore volume is 40.0 μl/g or less in a carbon material having an Lc value of 100 nm or more measured by the X-ray diffraction method, irreversible change of the structure due to the anisotropic expansion and contraction in the graphite layer at the time of charging and discharging is less likely to occur, which further improves cycle characteristics.

The total pore volume is preferably 27.5 μl/g to 35.0 μl/g, more preferably 28.0 μl/g to 33.0 μl/g. The embodiment is excellent in terms of the charge-discharge rate, and is particularly suitable for use in electric tools.

In the carbon material in a preferred embodiment of the present invention, pulverization is not performed after graphitization. Therefore, the carbon material has a rhombohedral peak ratio of 5% or less, preferably 1% or less.

By setting the rhombohedral peak ratio to be within such a range, an interlayer compound with lithium is formed smoothly. If the interlayer compound is used as a negative electrode material in a lithium ion secondary battery, the lithium occlusion/release reaction is hardly inhibited, which enhances a rapid charging/discharging characteristic.

It should be noted that the peak ratio x of the rhombohedral structure in a carbon material is obtained from actually measured peak strength P1 of a hexagonal structure (100) plane and actually measured peak strength P2 of a rhombohedral structure (101) plane by the following expression.

$$x=P2/(P1+P2)$$

(2) Method for Producing a Carbon Material

A carbon material in a preferred embodiment of the present invention can be produced by heating the particles of pulverized coke having a thermal history of 1,000° C. or less.

As a raw material of calcined coke, for example, petroleum pitch, coal pitch, coal pitch coke, petroleum coke and the mixture thereof can be used. Among these, preferred is the coke obtained by a delayed coking process under specific conditions.

Examples of raw materials to pass through a delayed coker include decant oil which is obtained by removing a solvent after the process of fluid catalytic cracking to heavy distillate at the time of crude refining, and tar obtained by distilling coal tar extracted from bituminous coal and the like at a temperature of 200° C. or more and heating it to 100° C. or more to impart sufficient flowability. These liquids are heated to preferably 450° C. or more, more preferably 500° C. or more, or still more preferably 510° C. or more, during the delayed coking process, at least at an inlet of the coking drum in order to increase the residual carbon ratio in the subsequent processes, resulting in improvement in the yield. Also, pressure inside the drum is kept at preferably an ordinary pressure or higher, more preferably 300 kPa or higher, still more preferably 400 kPa or higher to increase the capacity of a negative electrode. As described above, by performing coking under more severe conditions than usual, the reaction of the liquids is further enhanced and coke having a higher degree of polymerization can be obtained.

The obtained coke is to be cut out from the drum by water jetting, and roughly pulverized to lumps about the size of 5 centimeters with a hammer and the like. A double roll crusher and a jaw crusher can be used for the rough pulverization, and it is desirable to pulverize the coke so that the particles larger than 1 mm in size account for 90 mass % or more of the powder. If the coke is pulverized too much to generate a large amount of fine powder having a diameter of 1 mm or less, problems such as the coke dust stirred up after drying and the increase in burnouts may arise in the subsequent processes such as heating.

It is desirable that the area and aspect ratio of a specific optical structure of the calcined coke are within a specific range. The area and aspect ratio of an optical structure can be calculated by the above-mentioned method. Also, when the calcined coke is obtained as a lump of a few centimeters in size, the lump as obtained is embedded in resin and subjected to mirror-like finishing and the like, and the cross-section is observed by a polarizing microscope to calculate the area and aspect ratio of an optical structure.

In the case where the optical structures are observed in a rectangular field of 480 µm×640 µm in the cross-section of the coke under a polarizing microscope, when areas of the optical structures are accumulated from the smallest structure in an ascending order, an area of an optical structure whose accumulated area corresponds to 60% of the total area of all the optical structures is preferably 50 µm$^2$ or more and 5,000 µm$^2$ or less, more preferably 100 µm$^2$ or more and 3,000 µm$^2$ or less, and most preferably 100 µm$^2$ or more and 160 µm$^2$ or less. When the coke having the area of an optical structure within the above-mentioned range is pulverized and graphitized, a carbon material having the optical structures as described above can be obtained. Since such a carbon material is going to have a fully developed crystal structure, it can retain lithium ions at a higher density. Also, as the crystals develop in a more aligned state in the carbon material, when an electrode is pressed, crystal planes slide over each other by fracture along the crystal plane and the carbon material has a higher degree of freedom for the particle shape, which improves filling property and is preferable.

In the case where the optical structure of the coke is observed in the same way as described above, when the optical structures are counted from a structure of the smallest aspect ratio in an ascending order, the aspect ratio of the structure which ranks at the position of 60% in the total number of all the structures is preferably 1.5 or more and 6 or less, more preferably 2.0 or more and 3.0 or less, and most preferably 2.3 or more and 2.6 or less.

Next, the coke is to be pulverized.

In the case of pulverizing coke by a dry method, grindability is significantly reduced if water is contained in coke at the time of pulverization. Therefore, it is desirable to dry coke at around 100 to 1,000° C., preferably at 100 to 500° C. If coke has high-temperature thermal history, coke has a higher crushing strength, which reduces grindability. In addition, coke having high-temperature thermal history has developed anisotropy in crystals and higher cleavability, and the coke tends to be a flaky powder. There is not particular limit to the method of pulverization, and pulverization can be performed using a known jet mill, hammer mill, roller mill, pin mill, vibration mill or the like.

It is desirable to perform pulverization so that coke has a D50 value of from 1 µm or more and 30 µm or less. More preferably, pulverization is performed so that coke has a D50 value of from 1 µm or more and 10 µm or less.

Graphitization is performed at a temperature of 2,400° C. or higher, more preferably 2,800° C. or higher, and still more preferably 3,050° C. or higher, and the most preferably 3,150° C. or higher. The treatment at a higher temperature further promotes the development of the graphite crystals and an electrode having a higher storage capacity of lithium ion can be obtained. On the other hand, if the temperature is too high, it is difficult to prevent the sublimation of the graphite powder and an unnecessarily large amount of energy is required. Therefore, the graphitization is preferably 3,600° C. or lower.

It is desirable to use electric energy to attain the above temperature. Electric energy is more expensive than other heat source and in particular to attain a temperature of 2,000° C. or higher, an extremely large amount of electricity is consumed. Therefore, it is preferable not to consume the electric energy except for graphitization, and to calcine the carbon material prior to the graphitization to remove the organic volatile content: i.e. to make the fixed carbon content be 95% or more, preferably 98% or more, and still more preferably 99% or more. The calcination can be performed by, for example, heating the carbon material at 700 to 1,500° C. Since decrease in mass at the time of graphitization can be reduced by the calcination, a treatment amount at one time of the graphitization treatment apparatus can be increased.

The graphitization treatment is conventionally carried out under atmosphere without containing oxygen, for example, in an environment filled with nitrogen gas or argon gas. In contrast, in the present invention, it is preferable to perform the graphitization treatment in an environment with a certain concentration of oxygen gas or to perform oxidation treatment after the graphitization process. Generally, graphite has high activity sites on its surface and the high activity sites become a cause of side reaction inside a battery and caused decrease in the initial charge-discharge efficiency, cycle characteristics and power retention characteristics. In the carbon material of the present invention, since the high activity sites are removed by oxidation reaction, there are fewer high activity sites on the surface of graphite particles constituting the carbon material and side reaction inside the battery can be inhibited. As a result, it is possible to obtain a carbon material which enables improvement in the initial charge-discharge efficiency, cycle characteristics and power retention characteristics.

The method for producing a carbon material of the present invention comprises a process of bringing carbon material into contact with an oxygen gas ($O_2$) at a temperature of 500° C. or more. The temperature at which the carbon material is brought into contact with an oxygen gas is more preferably 1,000° C. or more. The upper temperature is the graphitization temperature. Specifically, the process can be conducted: (a) by bringing the carbon material into contact with oxygen during heating for graphitization, (b) by bringing the carbon material into contact with oxygen during the cooling process after the heating for graphitization, or (c) by separately performing heat treatment after the completion of the graphitization process and bringing the carbon material into contact with oxygen.

The graphitization treatment and the oxidation treatment can be also conducted in the same apparatus by not substituting the air in the graphitization furnace with nitrogen and argon. By conducting graphitization treatment and oxidation treatment by such a method, high activity sites on the surface of the graphite particles are removed due to the oxidation of the surface of the graphite particle, and as a result, battery characteristics are improved. Also, since the process and apparatus can be simplified, the method is improved in economic efficiency, safety, and mass productivity.

There is no limitation for the graphitization treatment as long as it is performed in an environment with a certain oxygen concentration. The treatment can be carried out, for example, by a method of putting a material to be graphitized in a graphite crucible in a state that the top of the material is in contact with an oxygen-containing gas by not closing a lid; in a state that the graphite crucible is provided with multiple oxygen inlets having a diameter of 1 mm to 50 mm; or in a state that the graphite crucible is provided with multiple oxygen inlet pipes having a diameter of 1 mm to 50 mm which are connected to outside the crucible; in an Acheson furnace filled with a packing material of carbon particles or graphite particles; and generating heat by passing a current through the material. In this case, in order to prevent the substances contained in the material to be graphitized from reacting explosively, or to prevent the explosively-reacted materials from being blown off, the crucible may be lightly shut off from the oxygen-containing gas by covering the top of the crucible with a carbonized or graphitized felt or porous plate. A small amount of argon or nitrogen may be allowed to flow into the furnace, however, it is preferable not to substitute the atmosphere completely with argon or nitrogen but to adjust the oxygen concentration in the vicinity of the surface of the material to be graphitized (within 5 cm) to 1% or more, preferably 1 to 20% in the graphitization process. As an oxygen-containing gas, air is preferable but a gas having a low oxygen concentration in which the oxygen concentration is adjusted to the above-mentioned level may be used as well. Using argon or nitrogen in a large amount requires energy for condensing the gas, and if the gas is caused to flow through, the heat required for the graphitization is to be exhausted out of the system and further energy is to be required. From the viewpoint of efficient use of energy and economic efficiency, it is preferable to perform the graphitization in an environment open to the atmosphere.

If the surface oxidation occurs after the graphitization, high activity sites on the surface of the graphite particles are removed, and the recombination of the carbon atom bond does not occur afterward. Accordingly, since there are few high activity sites on the surface of the obtained graphite particles, it serves as an electrode material which is less likely to cause side reaction inside a battery, and enables improvement in the initial charge-discharge efficiency and cycle characteristics. Therefore, it is most desirable to cause the surface oxidation during cooling in the graphitization process or after the graphitization process. Particularly in the case of performing graphitization in an environment open to the atmosphere, it is desirable to design the furnace so that air flows into it during cooling the graphitizing furnace and the oxygen concentration in the furnace falls within 1 to 20%. In the present invention, air was allowed to flow in and out during, before and after the graphitization treatment to produce oxidation in the cooling process after the graphitization treatment. Since the carbon material is heated to a temperature as high as 3,000° C. or more at the time of graphitization treatment, not only oxidation but also a combustion reaction is caused.

When oxidation treatment is performed separately after performing graphitization as in above (c), the treatment is performed in the presence of oxygen gas at a temperature of 500° C. or higher, at an appropriate oxygen gas concentration for an appropriate heating time as appropriate according to the temperature.

However, when the graphitization is carried out as described above, an impurity component derived from the carbon material is likely to precipitate in the region being in contact with an oxygen gas, and it is desirable to remove it. Examples of the method for removing the impurity include a method of removing the graphite material in the region from the position being in contact with an oxygen-containing gas to a predetermined depth. That is, the graphite material underlying deeper than the above position is obtained. The predetermined depth is 2 cm, preferably 3 cm and more preferably 5 cm from the surface.

In a preferable embodiment of the present invention, as the high activity sites on the particle surface are inactivated by oxidation reaction, the material is not subjected to pulverizing treatment after graphitization. Note that the material may be de-agglomerated after the graphitization to such a degree that the particles are not pulverized.

When an electrode is manufactured by employing as an active material the carbon material produced by modifying the surface shape and surface activity of the particles through a moderate oxidation treatment in a preferred embodiment of the present invention, the contact between the adjacent particles inside the electrode is stabilized by compressing the electrode. As a result, it is possible to make the electrode suitable for the repeated charging and discharging of a battery.

(3) Carbon Material for Battery Electrodes

The carbon material for battery electrodes in a preferred embodiment of the present invention contains the above-mentioned carbon material. By using the above-mentioned carbon material as a carbon material for a battery electrode, a battery electrode having low resistance and high input-output characteristics can be obtained, while maintaining a high capacity, a high energy density, a high coulomb efficiency and high cycle characteristics.

The carbon material for a battery electrode may be used as, for example, a negative electrode active material and an agent for imparting conductivity to a negative electrode of a lithium ion secondary battery.

The carbon material for battery electrodes in a preferred embodiment of the present invention may comprise the above-mentioned carbon material only. It is also possible to use the materials obtained by blending spherical natural graphite or artificial graphite having d002 of 0.3370 nm or less in an amount of 0.01 to 200 parts by mass and preferably 0.01 to 100 parts by mass; or by blending natural or artificial graphite having d002 of 0.3370 nm or less and aspect ratio of 2 to 100 in an amount of 0.01 to 120 parts by mass and preferably 0.01 to 100 parts by mass; based on 100 parts by mass of the above-mentioned carbon material. By using the carbon material mixed with other graphite materials, the carbon material can be added with excellent properties of other graphite materials while maintaining the excellent characteristics of the carbon material in a preferred embodiment of the present invention. With respect to mixing of these materials, the material to be mixed can be selected and the blending amount can be determined appropriately according to the required battery characteristics.

Carbon fiber may also be mixed with the carbon material for battery electrodes. The mixing amount is 0.01 to 20 parts by mass, preferably 0.5 to 5 parts by mass in terms of 100 parts by mass of the above-mentioned carbon material.

Examples of the carbon fiber include: organic-derived carbon fiber such as PAN-based carbon fiber, pitch-based carbon fiber, and rayon-based carbon fiber; and vapor-grown carbon fiber. Of those, particularly preferred is vapor-grown carbon fiber having high crystallinity and high heat conductivity. In the case of allowing the carbon fiber to adhere to the particle surfaces of the carbon material, particularly preferred is vapor-grown carbon fiber.

Vapor-grown carbon fiber is, for example, produced by: using an organic compound as a raw material; introducing an organic transition metal compound as a catalyst into a high-temperature reaction furnace with a carrier gas to form fiber; and then conducting heat treatment (see, for example, JP 60-54998 A and JP 2778434 B2). The vapor-grown carbon fiber has a fiber diameter of 2 to 1,000 nm, preferably 10 to 500 nm, and has an aspect ratio of preferably 10 to 15,000.

Examples of the organic compound serving as a raw material for carbon fiber include gas of toluene, benzene, naphthalene, ethylene, acetylene, ethane, natural gas, carbon monoxide or the like, and a mixture thereof. Of those, an aromatic hydrocarbon such as toluene or benzene is preferred.

The organic transition metal compound includes a transition metal serving as a catalyst. Examples of the transition metal include metals of Groups IVa, Va, VIa, VIIa, and VIII of the periodic table. Preferred examples of the organic transition metal compound include compounds such as ferrocene and nickelocene.

The carbon fiber may be obtained by pulverizing or disintegrating long fiber obtained by vapor deposition or the like. Further, the carbon fiber may be agglomerated in a flock-like manner.

Carbon fiber which has no pyrolyzate derived from an organic compound or the like adhering to the surface thereof or carbon fiber which has a carbon structure with high crystallinity is preferred.

The carbon fiber with no pyrolyzate adhering thereto or the carbon fiber having a carbon structure with high crystallinity can be obtained, for example, by firing (heat-treating) carbon fiber, preferably, vapor-grown carbon fiber in an inactive gas atmosphere. Specifically, the carbon fiber with no pyrolyzate adhering thereto is obtained by heat treatment in inactive gas such as argon at about 800° C. to 1,500° C. Further, the carbon fiber having a carbon structure with high crystallinity is obtained by heat treatment in inactive gas such as argon preferably at 2,000° C. or more, more preferably 2,000° C. to 3,000° C.

It is preferred that the carbon fiber contains branched fiber. Further, the fiber as a whole may have a portion having hollow structures communicated with each other. For this reason, carbon layers forming a cylindrical portion of the fiber are formed continuously. The hollow structure refers to a structure in which a carbon layer is rolled up in a cylindrical shape and includes an incomplete cylindrical structure, a structure having a partially cut part, two stacked carbon layers connected into one layer, and the like. Further, the cross-section is not limited to a complete circular shape, and the cross-section of the cylinder includes an oval or a polygonal shape.

Further, the average interplanar spacing of a (002) plane by the X-ray diffraction method, d002, of the carbon fiber is preferably 0.344 nm or less, more preferably 0.339 nm or less, particularly preferably 0.338 nm or less. Further, it is preferred that a thickness $L_c$ in a C-axis direction of crystallite, Lc, is 40 nm or less.

(4) Paste for Electrodes

The paste for an electrode in a preferred embodiment of the present invention contains the above-mentioned carbon material for a battery electrode and a binder. The paste for an electrode can be obtained by kneading the above-mentioned carbon material for a battery electrode with a binder. A known device such as a ribbon mixer, a screw-type kneader, a Spartan granulator, a Loedige mixer, a planetary mixer, or a universal mixer may be used for kneading. The paste for an electrode may be formed into a sheet shape, a pellet shape, or the like.

Examples of the binder to be used for the paste for an electrode include known binders such as: fluorine-based polymers such as polyvinylidene fluoride and polytetrafluoroethylene; and rubber-based binders such as styrene-butadiene rubber (SBR).

The appropriate use amount of the binder is 1 to 30 parts by mass in terms of 100 parts by mass of the carbon material for a battery electrode, and in particular, the use amount is preferably about 3 to 20 parts by mass.

A solvent can be used at a time of kneading. Examples of the solvent include known solvents suitable for the respective binders such as: toluene and N-methylpyrolidone in the case of a fluorine-based polymer; water in the case of SBR; dimethylformamide; isopropanol and the like. In the case of the binder using water as a solvent, it is preferred to use a thickener together. The amount of the solvent is adjusted so as to obtain a viscosity at which a paste can be applied to a current collector easily.

(5) Electrode

An electrode in a preferred embodiment of the present invention comprises a formed body of the above-mentioned paste for an electrode. The electrode is obtained, for example, by applying the above-mentioned paste for an electrode to a current collector, followed by drying and pressure-forming.

Examples of the current collector include foils and mesh of aluminum, nickel, copper, stainless steel and the like. The coating thickness of the paste is generally 50 to 200 μm. When the coating thickness becomes too large, a negative electrode may not be housed in a standardized battery container. There is no particular limitation to the paste coating method, and an example of the coating method includes a method involving coating with a doctor blade or a bar coater, followed by forming with roll pressing or the like.

Examples of the pressure forming include roll pressing, plate pressing, and the like. The pressure for the pressure forming is preferably about 1 to 3 t/cm². As the electrode density of the electrode increases, the battery capacity per volume generally increases. However, if the electrode density is increased too much, the cycle characteristic is generally degraded. If the paste for an electrode in a preferred embodiment of the present invention is used, the degradation in the cycle characteristic is small even when the electrode density is increased. Therefore, an electrode having the high electrode density can be obtained. The maximum value of the electrode density of the electrode obtained using the paste for an electrode in a preferred embodiment of the present invention is generally 1.6 to 1.9 g/cm³. The electrode thus obtained is suitable for a negative electrode of a battery, in particular, a negative electrode of a secondary battery.

(6) Battery, Secondary Battery

A battery or a secondary battery can be produced, using the above-mentioned electrode as a constituent element (preferably, as a negative electrode).

The battery or secondary battery in a preferred embodiment of the present invention is described by taking a lithium ion secondary battery as a specific example. The lithium ion secondary battery has a structure in which a positive electrode and a negative electrode are immersed in an electrolytic solution or an electrolyte. As the negative electrode, the electrode in a preferred embodiment of the present invention is used.

In the positive electrode of the lithium ion secondary battery, a transition metal oxide containing lithium is generally used as a positive electrode active material, and preferably, an oxide mainly containing lithium and at least one kind of transition metal elements selected from the group consisting of Ti, V, Cr, Mn, Fe, Co, Ni, Mo, and W, which is a compound having a molar ratio of lithium to a transition metal element of 0.3 to 2.2, is used. More preferably, an oxide mainly containing lithium and at least one kind of transition metal elements selected from the group consisting of V, Cr, Mn, Fe, Co and Ni, which is a compound having a molar ratio of lithium to a transition metal of 0.3 to 2.2, is used. It should be noted that Al, Ga, In, Ge, Sn, Pb, Sb, Bi, Si, P, B, and the like may be contained in a range of less than 30% by mole with respect to the mainly present transition metal. Of the above-mentioned positive electrode active materials, it is preferred that at least one kind of material having a spinel structure represented by a general formula $Li_xMO_2$ (M represents at least one kind of Co, Ni, Fe, and Mn, and x is 0 to 1.2), or $Li_yN_2O_4$ (N contains at least Mn, and y is 0 to 2) be used.

Further, as the positive electrode active material, there may be particularly preferably used at least one kind of materials each including $Li_yM_aD_{1-a}O_2$ (M represents at least one kind of Co, Ni, Fe, and Mn, D represents at least one kind of Co, Ni, Fe, Mn, Al, Zn, Cu, Mo, Ag, W, Ga, In, Sn, Pb, Sb, Sr, B, and P with the proviso that the element corresponding to M being excluded, y=0 to 1.2, and a=0.5 to 1) or materials each having a spinel structure represented by $Li_z(N_bE_{1-b})_2O_4$ (N represents Mn, E represents at least one kind of Co, Ni, Fe, Mn, Al, Zn, Cu, Mo, Ag, W, Ga, In, Sn, Pb, Sb, Sr, B and P, b=1 to 0.2, and z=0 to 2).

Specifically, there are exemplified $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, $Li_xMn_cFe_{2-c}O_4$ and $Li_xNi_dMn_eCo_{1-d-e}O_2$ (where, x=0.02 to 1.2, a=0.1 to 0.9, b=0.8 to 0.98, c=1.6 to 1.96, d=0.1 to 0.8, e=0.1 to 0.8−d, and z=2.01 to 2.3). As the most preferred transition metal oxide containing lithium, there are given $Li_xCoO_2$, $Li_xNiO_2$, $Li_xMnO_2$, $Li_xCo_aNi_{1-a}O_2$, $Li_xMn_2O_4$, $Li_xCo_bV_{1-b}O_z$ and $Li_xNi_dMn_eCo_{1-d-e}O_2$ (x=0.02 to 1.2, a=0.1 to 0.9, b=0.9 to 0.98, d=0.1 to 0.8, e=0.1 to 0.8−d, and z=2.01 to 2.3). It should be noted that the value of x is a value before starting charge and discharge, and the value increases and decreases in accordance with charge and discharge.

Although D50 of the positive electrode active material is not particularly limited, it is preferably 0.1 to 50 μm. It is preferred that the volume occupied by the particles of 0.5 to 30 μm be 95% or more. It is more preferred that the volume occupied by the particle group with a particle diameter of 3 μm or less be 18% or less of the total volume, and the volume occupied by the particle group of 15 μm or more and 25 μm or less be 18% or less of the total volume.

Although the specific area of the positive electrode active material is not particularly limited, the area is preferably 0.01 to 50 m²/g, particularly preferably 0.2 m²/g to 1 m²/g by a BET method. Further, it is preferred that the pH of a supernatant obtained when 5 g of the positive electrode active material is dissolved in 100 ml of distilled water be 7 or more and 12 or less.

In a lithium ion secondary battery, a separator may be provided between a positive electrode and a negative electrode. Examples of the separator include non-woven fabric, cloth, and a microporous film each mainly containing polyolefin such as polyethylene and polypropylene, a combination thereof, and the like.

As an electrolytic solution and an electrolyte forming the lithium ion secondary battery in a preferred embodiment of the present invention, a known organic electrolytic solution, inorganic solid electrolyte, and polymer solid electrolyte may be used, but an organic electrolytic solution is preferred in terms of electric conductivity.

As an organic electrolytic solution, preferred is a solution of an organic solvent such as: an ether such as diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, ethylene glycol phenyl ether, 1,2-dimethoxyethane, or diethoxyethane; an amide such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, or hexamethylphosphorylamide; a sulfur-containing compound such as dimethylsulfoxide or sulfolane; a dialkyl ketone such as methyl ethyl ketone or methyl isobutyl ketone; a cyclic ether such as ethylene oxide, propylene oxide, tetrahydrofuran, 2-methoxytetrahydrofuran, or 1,3-dioxolan; a carbonate such as ethylene carbonate, butylene carbonate, diethyl carbonate, dimethyl carbonate, or propylene carbonate; γ-butyrolactone; N-methylpyrrolidone; acetonitrile; nitromethane; or the like. There are more preferably exemplified: a carbonate such as ethylene carbonate, butylene carbonate, diethyl carbonate, dimethyl carbonate, propylene carbonate, vinylene carbonate; γ-butyrolactone; 1,3-dioxolan; diethyl ether; diethoxyethane; dimethylsulfoxide; acetonitrile; tetrahydrofuran; and the like. A nonaqueous solvent such as ethylene carbonate or propylene carbonate may be particularly preferably used. One kind of those solvents may be used alone, or two or more kinds thereof may be used as a mixture.

A lithium salt is used for a solute (electrolyte) of each of those solvents. Examples of a generally known lithium salt include $LiClO_4$, $LiBF_4$, $LiPF_6$, $LiAlCl_4$, $LiSbF_6$, LiSCN, LiCl, $LiCF_3SO_3$, $LiCF_3CO_2$, $LiN(CF_3SO_2)_2$, and the like.

Examples of the polymer solid electrolyte include a polyethylene oxide derivative and a polymer containing the derivative, a polypropylene oxide derivative and a polymer containing the derivative, a phosphoric acid ester polymer, a polycarbonate derivative and a polymer containing the derivative, and the like.

It should be noted that there is no constraint for the selection of members required for the battery configuration other than the aforementioned members.

EXAMPLES

Hereinafter, the present invention is described in more detail by way of typical examples. It should be noted that these examples are merely for illustrative purposes, and the present invention is not limited thereto.

It should be noted that, as for the carbon materials of Examples and Comparative Examples, observation and data analysis with respect to optical structures, average interplanar spacing (d002) by an X-ray diffraction method, R value, D50, and specific surface area by the BET method are measured by the methods described in detail in the "Mode for carrying out the invention" of the present description. Further, the methods for measuring other physical properties are given below.

(1) Powder XRD Measurement

Carbon powder samples were filled in a sample plate made of glass (recessed portion of a sample plate: 18×20 mm, depth: 0.2 mm) and subjected to measurement under the following conditions:

XRD apparatus: SmartLab manufactured by Rigaku (registered trademark)
X-ray type: Cu-Kα ray
Method for removing Kβ ray: Ni filter
X-ray output: 45 kV, 200 mA
Measurement range: 5.0 to 10.0 deg.
Scanning speed: 10.0 deg./min.

Profile fitting was performed by smoothing the obtained waveform, removing the background, and removing Kα2. From the obtained I004 as the peak intensity of (004) plane and I110 as the peak intensity of (110) plane, the peak intensity ratio I110/I004 as an index of orientation was calculated. As a peak on each plane, the highest intensity within the range as described below was selected, respectively.

(004) plane: 54.0 to 55.0 deg.
(110) plane: 76.5 to 78.0 deg.

(2) Measurement of an Average Circularity

The carbon material was purified by allowing it to pass through a filter with 106 μm openings to remove fine refuse. 0.1 g of the obtained sample was added to 20 ml of ion-exchanged water and uniformly dispersed by adding 0.1 to 0.5 mass % of surfactant to prepare the sample solution for the measurement. The dispersion was performed by treating the mixture for five minutes using ultrasonic washing machine UT-105S (manufactured by Sharp Manufacturing Systems Corporation).

The obtained sample solution for the measurement was put in a flow-type particle image analyzer FPIA-2100 (manufactured by Sysmex Corporation) and 10,000 particles were subjected to image analysis in the LPF mode. The median value of the obtained circularity of each particle was taken as an average circularity.

(3) Measurement of Pore Volume

About 5 g of a carbon material was weighed out in a cell made of glass, and after drying it under reduced pressure of 1 kPa or less at 300° C. for about 3 hours to remove adsorbed components such as water, the mass of the carbon material was measured. Subsequently, the nitrogen-gas adsorption isotherm of the dried carbon material in liquid nitrogen cooling was measured by Autosorb-1 manufactured by Quantachrome Instruments. A total pore volume of pores having a diameter of 0.4 μm or less was determined from the nitrogen adsorption amount at the measurement points of $P/P_0$=0.992 to 0.995 on the obtained adsorption isotherm and the mass of the graphite powder after drying.

(4) Method for Evaluating Batteries a) Production of Paste:

To 100 parts by mass of a carbon material, 1.5 parts by mass of carboxymethylcellulose (CMC) as a thickener and water were added as appropriate to adjust the viscosity. 3.8 parts by mass of an aqueous solution in which 40% of styrene butadiene rubber (SBR) fine particles as a solid ratio is dispersed was added thereto and mixed while being stirred to thereby obtain a slurry dispersion having enough flowability to be used as a main material stock solution.

b) Production of a Negative Electrode:

The main material stock solution was applied to a high-purity copper foil to a thickness of 150 μm using a doctor blade and was dried in vacuum at 70° C. for 12 hours. After punching out the copper foil to obtain a piece having an applied portion of 20 cm$^2$, the piece was sandwiched between pressing plates made of super-steel and pressed so that a press pressure becomes about $1\times10^2$ to $3\times10^2$ N/mm$^2$ ($1\times10^3$ to $3\times10^3$ kg/cm$^2$) to obtain a negative electrode 1. Also, after punching out the above applied portion into a size of 16 mmΦ, the portion was pressed in a similar manner to negative electrode 1 so that a press pressure becomes about $1\times10^2$ N/mm$^2$ ($1\times10^3$ kg/cm$^3$) to obtain a negative electrode 2.

c) Production of a Positive Electrode:

90 g of Li$_3$Ni$_{1/3}$Mn$_{1/3}$Co$_{1/3}$O$_2$ (D50: 7 μm), 5 g of carbon black as a conductive assistant (manufactured by TIMCAL, C45) and 5 g of polyvinylidene fluoride (PVdF) as a binder were mixed and stirred while adding N-methylpyrrolidone as appropriate to obtain a slurry dispersion.

The dispersion was applied to a uniform thickness onto an aluminum foil having a thickness of 20 μm using a roll coater. After drying, the foil was subjected to roll pressing and punched out to get a piece having an applied portion of 20 cm$^2$ to obtain a positive electrode.

d) Production of a Battery:

[Two-Electrode Cell]

In the above negative electrode 1 and positive electrode, a nickel tab and an aluminum tab were fixed to the copper foil and the aluminum foil, respectively. These electrodes were faced to each other via a polypropylene microporous membrane and laminated. After packing the laminated electrodes by an aluminum laminated film and injecting an electrolyte thereto, the opening was sealed by thermal fusion bonding to fabricate a battery.

[Lithium Counter Electrode Cell]

In a cell case (inner diameter: about 18 mm) with a screwed-type lid made of polypropylene, the above negative electrode 2 and a metal lithium foil punched out into a size of 16 mmΦ were sandwiched and stacked between separators (microporous films made of polypropylene (Cell Guard 2400)). An electrolyte was added into the cell case to obtain a cell for testing.

e) Electrolyte:

In a mixed solution of 8 parts by mass of ethylene carbonate (EC) and 12 parts by mass of diethyl carbonate (DEC), LiPF$_6$ was dissolved as an electrolyte so as to adjust the LiPF$_6$ concentration to 1 mol/l.

f) Measurement Tests of Discharge Capacity and Initial Coulomb Efficiency:

Tests were conducted using a lithium counter electrode cell. Constant current (CC) charging was performed at 0.2 mA from a rest potential to 0.002 V. Next, the charging was switched to constant voltage (CV) charging at 0.002 V with a cut-off current value of 25.4 μA.

A discharging was performed in the constant-current mode at a current of 0.2 mA with an upper limit voltage of 1.5 V.

The test was performed in a thermostatic chamber set at 25° C. At that time, the capacity at the initial discharging was defined as a discharge capacity. Also, the ratio of the electricity of the initial charge and discharge, i.e. discharge electricity quantity/charge electricity quantity in percentage was defined as an index of the initial coulomb efficiency.

g) Measurement Tests of Charge/Discharge Cycle Capacity Retention Rate:

Tests were conducted using a two-electrode cell. The constant-current (CC) mode charging was performed at a constant current of 50 mA (corresponding to 2 C) from a rest potential to an upper limit voltage of 4.15 V. Next, the charging was switched to constant voltage (CV) charging mode with a cut off current value of 1.25 mA.

A discharging was performed in the constant-current mode at a current of 50 mA with a lower limit voltage of 2.8 V.

The charge/discharge was repeated 500 cycles in a thermostatic chamber set at 25° C. under the above-mentioned conditions.

h) Measurement Test of DC-IR:

On the basis of the battery capacity obtained by the initial battery capacity (1 C=25 mAh), the constant-current (CC) mode discharging at 0.1 C was performed from a fully charged state at 0.1 C for three hours and a half (State of Charge (SOC): 50%). After a rest of 30 minutes, discharging at 25 mA for five seconds was conducted to determine the Direct Current Internal Resistance (abbreviated as DC-IR) from the amount of voltage drop according to Ohm's law (R $[\Omega]=\Delta V [V]/0.025 [A]$).

i) Test of Charge-Discharge Rate

Tests were conducted using a two-electrode cell. The cell was charged in constant-current (CC) and constant-voltage (CV) mode at 0.2 C (0.2 C nearly equals to 5 mA) with an upper limit voltage of 4.15 V and a cut off current of 1.25 mA. Subsequently discharging was performed in the CC mode at a current of 10 C (around 250 mA) with a lower limit voltage of 2.8 V. The ratio of the discharge capacity at 10 C to the discharge capacity at 0.2 C was calculated.

In addition, after the cell was discharged in the CC mode at a current of 0.2 C with a minimum voltage of 2.8 V, the cell was charged in CC mode at 10 C with a maximum voltage of 4.15V, and the ratio of the charge capacity at 10 C to the charge capacity at 0.2 C was calculated.

j) Electrode Density:

The main material stock solution was applied to a high-purity copper foil to a thickness of 150 μm using a doctor blade and was dried in vacuum at 70° C. for 12 hours. After punching out the electrode into a size of 15 mmΦ, it was sandwiched between pressing plates made of super-steel and pressed so that a press pressure applied to the electrode becomes about $1\times10^2$ N/mm² ($1\times10^3$ kg/cm³) and the electrode density was calculated from the electrode weight and electrode thickness.

Example 1

A crude oil produced in Liaoning, China (28° API, wax content of 17% and sulfur content of 0.66%) was distilled under ordinary pressure. Using a Y-type zeolite catalyst in a sufficient amount against the heavy fraction, catalytic cracking in a fluidized bed was performed at 510° C. under ordinary pressure. A solid content such as a catalyst was centrifugally separated until the obtained oil became clear to thereby obtain decant oil. The oil was subjected to a small-sized delayed coking process. After keeping the drum inlet temperature at 505° C. and the drum internal pressure to 600 kPa (6 kgf/cm²) for ten hours, the drum was water-cooled to obtain black chunks. After pulverizing the obtained black chunks into pieces up to five centimeters in size with a hammer, they were dried in a kiln at 200° C. The resultant was obtained as coke 1.

Coke 1 was observed under a polarizing microscope for the image analysis in the above-mentioned manner. As a result of the measurement, when areas of the optical structures are accumulated from the smallest structure in an ascending order, an area of a structure whose accumulated area corresponds to 60% of the total area was 153 μm². When the detected structures are arranged from the structure of the smallest aspect ratio in an ascending order, the aspect ratio of the structure which ranks at the position of 60% in the total number of all the structures was 2.41.

Figure 1:
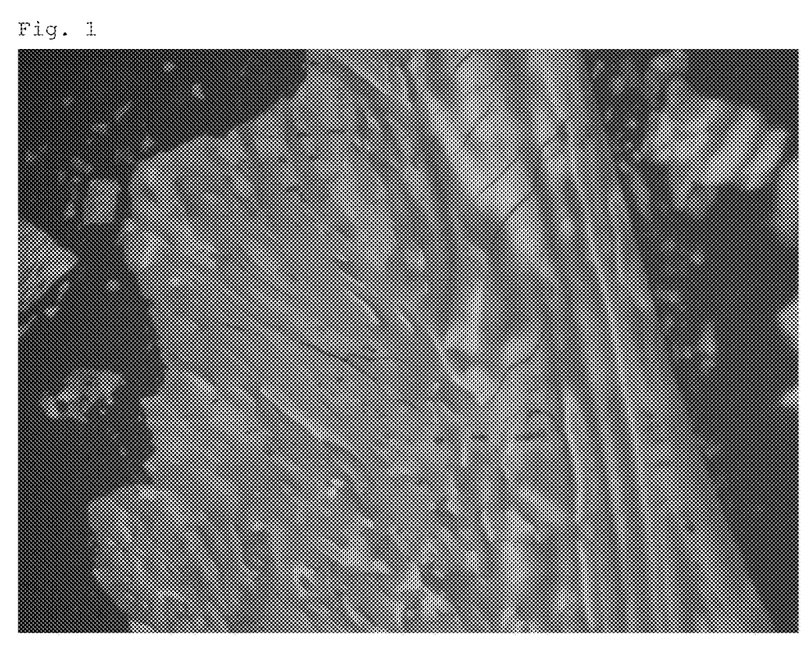
FIG. 1 shows a polarizing microscope image (480 μm×640 μm) of the coke of Example 1. The black portion is embedded resin and the gray portion is optical structures.

FIG. 1 shows a polarizing microscope image (480 μm×640 μm) of the coke 1. The black portion is embedding resin and the gray portion is optical structures.

Coke 1 was pulverized with a bantam mill produced by Hosokawa Micron Corporation and subsequently coarse powder was excluded with a sieve having a mesh size of 45 μm. The pulverized coke was further pulverized with a jet mill manufactured by Seishin Enterprise Co., Ltd. Next, the pulverized coke is subjected to air classification with Turboclassifier TC-15N produced by Nisshin Engineering Inc. to obtain a powder coke 1 (D50=6.3 μm), substantially containing no particles each having a particle diameter of 1.0 μm or less.

A graphite crucible was filled with the powder coke 1 and subjected to heat treatment for one week so that the maximum achieving temperature in Acheson furnace was adjusted to about 3,300° C. The crucible was provided with multiple oxygen inlets so as to allow air to flow in and out of the crucible during, before and after the graphitization treatment, and the oxidation of the powder was performed for about one week during the cooling process to obtain a carbon material comprising particles that are not flaky.

After measuring the various physical properties of the obtained sample, an electrode was produced as described above and the cycle characteristics and the like were measured. Table 1 shows the results.

Figure 2:
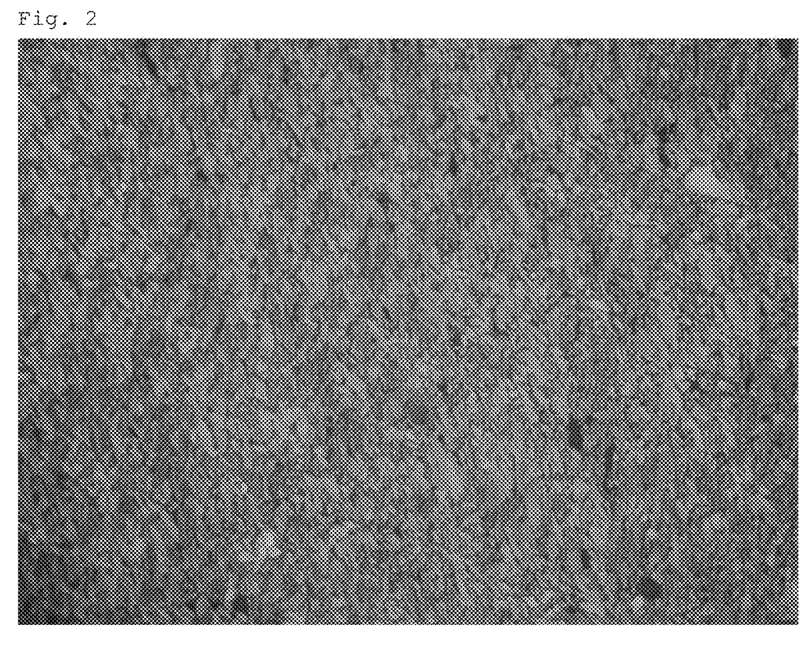
FIG. 2 shows a polarizing microscope image (480 μm×640 μm) of the carbon material of Example 1. The black portion is embedding resin and the gray portion is optical structures.

FIG. 2 shows a polarizing microscope image (480 μm×640 μm) of the carbon material. The black portion is resin and the gray portion is optical structures.

Comparative Example 1

Coke 1 described in Example 1 was pulverized with a bantam mill produced by Hosokawa Micron Corporation and subsequently coarse powder was excluded with a sieve having a mesh size of 45 μm. Next, the pulverized coke is subjected to air classification with Turboclassifier TC-15N produced by Nisshin Engineering Inc. to obtain a powder coke 2 (D50=17.3 μm), substantially containing no particles each having a particle diameter of 1.0 μm or less.

A graphite crucible was filled with the powder coke 2 and subjected to heat treatment for one week so that the maximum achieving temperature in Acheson furnace was adjusted to about 3,300° C. The crucible was provided with multiple oxygen inlets so as to allow air to flow in and out of the crucible during, before and after the graphitization treatment, and the oxidation of the powder was performed for about one week during the cooling process to obtain a carbon material comprising particles that are not flaky.

After measuring the various physical properties of the obtained sample, an electrode was produced as described above and the cycle characteristics and the like were measured. Table 1 shows the results.

Comparative Example 2

Coke 1 described in Example 1 was calcined by heating in a rotary kiln (external-heating type with an electrical heater; aluminum oxide SSA-S; Φ 120 mm inner tube) in which the outer wall temperature in the center of the inner tube is set at 1,450° C. by adjusting the feeding rate of the coke and tilting angle of the inner tube so as to set the residence time to 15 minutes to thereby obtain calcined coke 1.

The calcined coke 1 was observed by a polarizing microscope and the image analysis was performed in the same way as in Example 1. The results are shown in Table 1.

The calcined coke 1 was pulverized with a bantam mill produced by Hosokawa Micron Corporation and subsequently coarse powder was excluded with a sieve having a mesh size of 45 μm. Next, the pulverized calcined coke is subjected to air classification with Turboclassifier TC-15N produced by Nisshin Engineering Inc. to obtain a powder calcined coke 1, substantially containing no particles each having a particle diameter of 1.0 μm or less.

A graphite crucible was filled with the powder calcined coke 1 and subjected to heat treatment for one week so that the maximum achieving temperature in Acheson furnace was adjusted to about 3,300° C. The crucible was provided with multiple oxygen inlets so as to allow air to flow in and out of the crucible during, before and after the graphitization treatment, and the oxidation of the powder was performed for about one week during the cooling process to obtain a carbon material comprising flaky particles.

After measuring the various physical properties of the obtained carbon material, an electrode was produced in the same way as in Example 1 and the cycle characteristics and the like were measured. Table 1 shows the results.

In this example, the carbon material is highly oriented due to the flaky particles, resulting in high resistance and degradation of rapid charge-discharge characteristics.

Comparative Example 3

2 mass % of boron carbide was added to the powder coke 2 in Comparative Example 1 and subjected to heat treatment in an argon atmosphere at 2,600° C. in a high-temperature furnace manufactured by Kurata Giken, the powder was homogenized well to be used as a sample.

After measuring the various physical properties of the obtained carbon material, an electrode was produced in the same way as in Example 1 and the cycle characteristics and the like were measured. Table 1 shows the results.

In this example, high reactivity portions on the particle surface are removed by the addition of boron but a high cost is involved due to the use of argon. In addition, the specific surface area and the pore volume become significantly small under the influence of the heat treatment in an inert atmosphere, resulting in significant degradation of charge-discharge characteristics at a high rate. Further, long-term cycle characteristics are deteriorated due to the residual impurities.

Comparative Example 4

The coke 1 described in Example 1 was pulverized with a jet mill to obtain carbonaceous particles having a D50 of 10.2 μm. The particles and a binder pitch having a softening point of 80° C. were mixed at a ratio by mass of 100:30. The mixture was put in a kneader heated to 140° C. and mixed for 30 minutes.

The mixture was filled in a mold of a molding press and molded under a pressure of 0.30 MPa to produce a molded body.

The obtained molded body was placed into a crucible made of alumina, and retained in a nitrogen stream at 1,300° C. for five hours in a roller hearth kiln to remove volatile components. Next, after putting the resultant in a graphite crucible and sealed with a lid, graphitization treatment was conducted by heating the molded body for one week so that the maximum achieving temperature in Acheson furnace was adjusted to about 3,300° C. to produce lump graphite.

The obtained lump graphite was pulverized with a bantam mill produced by Hosokawa Micron Corporation and subsequently coarse powder was excluded with a sieve having a mesh size of 45 μm. Next, the pulverized coke is subjected to air classification with Turboclassifier TC-15N produced by Nisshin Engineering Inc. to obtain a carbon material, substantially containing no particles each having a particle diameter of 1.0 μm or less.

After measuring the various physical properties of the obtained carbon material, an electrode was produced in the same way as in Example 1 and the cycle characteristics and the like were measured. Table 1 shows the results.

In this example, by performing pulverization treatment after graphitization, the surface of the particle is damaged and active edge portions are treated, resulting in high initial coulomb efficiency. However, the carbon material has a large volume of total pores, resulting in degradation in cycle characteristics. Further, although the carbon material has large-size pores, rhombohedral crystals are present in the material by performing pulverization treatment after graphitization, resulting in a low level of rapid charge-discharge characteristics.

Comparative Example 5

Spherical natural graphite having a D50 of 17 μm, d002 of 0.3354 nm, specific surface area of 5.9 $m^2/g$ and circularity of 0.98 was filled and sealed in a rubber container, and subjected to pressure treatment at a liquid pressure of 150 MPa (1,500 $kgf/cm^2$) by a hydrostatic press machine. The obtained black chunks were pulverized by a pin mill to obtain a graphite powder material.

After measuring the various physical properties of the obtained carbon material, an electrode was produced in the same way as in Example 1 and the cycle characteristics and the like were measured. Table 1 shows the results.

In this example, the carbon material uses spherical natural graphite as a raw material and has a large specific surface area and a large total volume of pores due to the compression molding, resulting in degradation in cycle characteristics.

Comparative Example 6

Residue obtained by distilling crude oil produced in the West Coast of the United States of America under reduced pressure was used as a raw material. The properties of the material are 18° API, wax content of 11 mass % and sulfur content of 3.5 mass %. The material was subjected to a small-sized delayed coking process. After keeping the drum inlet temperature at 490° C. and the drum internal pressure to 200 kPa (2 $kgf/cm^2$) for ten hours, the drum was water-cooled to obtain black chunks. After pulverizing the obtained black chunks into pieces up to five centimeters in size with a hammer, they were dried at 200° C. in a kiln to obtain coke 3.

The coke 3 was observed under a polarizing microscope for the image analysis in the same way as in Example 1. Table 1 shows the results.

The coke 3 was pulverized and classified in the same way as in Example 1 and graphitized in the same way as in Example 1 to obtain a carbon material comprising particles that are not flaky.

After measuring the various physical properties of the obtained carbon material, an electrode was produced in the same way as in Example 1 and the cycle characteristics and the like were measured. Table 1 shows the results.

In this Example, the carbon material can retain few lithium ions due to fine optical structures. Accordingly, the electrode has a low volume capacity density and inconvenience is caused for obtaining a battery having a high density.

Comparative Example 7

Graphitized mesocarbon microbeads manufactured by Osaka Gas Chemicals Co., Ltd. was subjected to oxidation treatment in air at 1,100° C. for one hour in a rotary kiln to obtain a carbon material.

After measuring the various physical properties of the obtained carbon material, an electrode was produced in the same way as in Example 1 and the cycle characteristics and the like were measured. Table 1 shows the results.

In this Example, the resistance in a battery is very high due to high degree of circularity of the particles, and as a consequence the cycle characteristics are degraded.

carbon material, when areas of the optical structures are accumulated from a smallest structure in an ascending order, SOP represents an area of an optical structure whose accumulated area corresponds to 60% of a total area of all the optical structures; when the structures are counted from a structure of a smallest aspect ratio in an ascending order, AROP represents an aspect ratio of a structure which ranks at a position of 60% in a total number of all the structures; and when D50 represents a median diameter in a volume-based cumulative particle size distribution by laser diffraction method, SOP, AROP and D50 satisfy the following relationships:

$$1.5 \leq AROP \leq 6.0 \text{ and}$$

$$0.2 \times D50 \leq (SOP \times AROP)^{1/2} < 2 \times D50.$$

2. The carbon material as claimed in claim 1, wherein the carbon material has a D50 value of 1 μm or more and 30 μm or less.

3. The carbon material as claimed in claim 1, whose BET specific surface area is 3.0 m²/g or more and 9.0 m²/g or less.

4. The carbon material as claimed in claim 1, whose R value (ID/IG) as being an intensity ratio between a peak intensity (ID) of a peak in a vicinity of 1350 cm$^{-1}$ and a peak intensity (IG) of a peak in a vicinity of 1580 cm$^{-1}$ measured by Raman spectroscopy spectra is 0.08 or more and 0.18 or less.

TABLE 1

| | | Ex. 1 | Comparative Ex. 1 | Comparative Ex. 2 | Comparative Ex. 3 | Comparative Ex. 4 | Comparative Ex. 5 | Comparative Ex. 6 | Comparative Ex. 7 |
|---|---|---|---|---|---|---|---|---|---|
| Area (SOP) | μm² | 5.0 | 18.4 | 14.2 | 18.7 | 26.0 | 18.2 | 3.0 | 29.7 |
| Aspect ratio (AROP) | — | 2.19 | 2.12 | 2.26 | 2.11 | 1.99 | 2.16 | 2.13 | 2.11 |
| D50 | μm | 6.3 | 17.3 | 19.3 | 17 | 21 | 16.8 | 18.5 | 16.2 |
| (SOP*AROP)$^{1/2}$/D50 | — | 0.53 | 0.36 | 0.29 | 0.37 | 0.34 | 0.37 | 0.14 | 0.49 |
| d002 | nm | 0.3357 | 0.3357 | 0.3360 | 0.3354 | 0.3356 | 0.3355 | 0.3365 | 0.3365 |
| BET specific surface area | m²/g | 6.1 | 2.0 | 2.1 | 0.8 | 3.4 | 5.6 | 1.4 | 1.5 |
| Total volume of pores | μl/g | 32.0 | 8.9 | 9.2 | 3 | 22.3 | 20.8 | 11.8 | 9.3 |
| Average circularity | — | 0.88 | 0.89 | 0.83 | 0.90 | 0.87 | 0.88 | 0.90 | 0.97 |
| I110/I004 | — | 0.28 | 0.17 | 0.04 | 0.20 | 0.39 | 0.29 | 0.38 | 0.65 |
| Raman R value | — | 0.15 | 0.12 | 0.12 | 0.25 | 0.05 | 0.30 | 0.12 | 0.30 |
| Structure area of the material coke corresponding to 60% | μm² | 124 | 153 | 111 | 153 | 153 | — | 11.4 | — |
| Aspect ratio of the material coke ranking at the position of 60% | — | 2.57 | 2.41 | 2.81 | 2.41 | 2.41 | — | 1.91 | — |
| Electrode density (2t press) | g/cm³ | 1.53 | 1.60 | 1.66 | 1.60 | 1.61 | 1.62 | 1.30 | 1.37 |
| Discharge capacity | mAh/g | 350 | 350 | 352 | 348 | 351 | 358 | 333 | 340 |
| Discharge capacity density | mAh/cm³ | 536 | 560 | 584 | 557 | 565 | 580 | 433 | 466 |
| Initial coulomb efficiency | % | 91 | 90 | 79 | 91 | 90 | 91 | 92 | 93 |
| Cycle capacity retention rate (500 cycles) | % | 92 | 96 | 94 | 76 | 84 | 73 | 96 | 72 |
| DC-IR (SOC 50%) | Ω | 1 | 1.4 | 1.7 | 1.9 | 1.4 | 1.3 | 1.6 | 2.5 |
| Charge capacity retention rate (10 C-rated) | % | 70 | 57 | 44 | 43 | 49 | 56 | 45 | 41 |
| Discharge capacity retention rate (10 C-rated) | % | 68 | 55 | 40 | 42 | 44 | 53 | 42 | 39 |

The invention claimed is:

1. A carbon material, being a non-flaky carbon material, wherein a ratio between a peak intensity I110 of (110) plane and a peak intensity I004 of (004) plane of a graphite crystal determined by a powder XRD measurement, I110/I004, is 0.10 or more and 0.35 or less; an average circularity is 0.80 or more and 0.95 or less; an average interplanar spacing d002 of (002) plane by an X-ray diffraction method is 0.337 nm or less; and a total pore volume of pores having a diameter of 0.4 μm or less measured by a nitrogen gas adsorption method is 25.0 μl/g or more and 40.0 μl/g or less; and by observing optical structures in a cross-section of the 5. A method for producing the carbon material as claimed in claim 1, comprising a process of graphitizing particles with D50 of 10 μm or less obtained by pulverizing a coke having a thermal history of 1,000° C. or less by heating at 2,400° C. to 3,600° C., and a process of bringing the pulverized particles into contact with an oxygen gas during heating, wherein, by observing optical structures in a cross-section of the coke, when areas of the optical structures are accumulated from a smallest structure in an ascending order, an area of an optical structure whose accumulated area corresponds to 60% of a total area of all the optical structures is 50 to 5,000 μm²; and when the optical structures are counted from a structure of a smallest aspect ratio in an ascending order, an aspect ratio of a structure which ranks at a position of 60% in a total number of all the structures is 1.5 or more and 6 or less.

6. The method for producing a carbon material as claimed in claim 5, wherein the process of bringing the pulverized particles into contact with an oxygen gas is conducted at a time of heating in the process of graphitization.

7. The method for producing a carbon material as claimed in claim 5, wherein the process of bringing the pulverized particles into contact with an oxygen gas is conducted at a time of cooling after the process of graphitization.

8. The method for producing a carbon material as claimed in claim 5, wherein the process of bringing the pulverized particles into contact with an oxygen gas is conducted in a separate heating treatment after completion of the graphitization process.

9. A carbon material for a battery electrode, comprising the carbon material claimed in claim 1.

10. A paste for an electrode comprising the carbon material for a battery electrode claimed in claim 9 and a binder.

11. An electrode for a lithium battery comprising the formed body of the paste for an electrode claimed in claim 10.

12. A lithium-ion secondary battery comprising the electrode claimed in claim 11 as a constituting element.

13. A method for producing an electrode for a lithium battery, comprising a process of applying the paste for an electrode claimed in claim 10 on a current collector followed by drying and compressing at a pressure of 1 to 3 t/cm$^2$.

* * * * *